J. W. THROPP.
ANTIFRICTION BEARING.
APPLICATION FILED MAR. 23, 1917.

1,263,964.

Patented Apr. 23, 1918.
2 SHEETS—SHEET 1.

WITNESSES

INVENTOR
Joseph W. Thropp
BY
ATTORNEYS

J. W. THROPP.
ANTIFRICTION BEARING.
APPLICATION FILED MAR. 23, 1917.

1,263,964.

Patented Apr. 23, 1918.
2 SHEETS—SHEET 2.

WITNESSES
William P. Goebel.
T. Harr Anderson

INVENTOR
Joseph W. Thropp
BY
ATTORNEYS

UNITED STATES PATENT OFFICE.

JOSEPH W. THROPP, OF TRENTON, NEW JERSEY.

ANTIFRICTION-BEARING.

1,263,964.  Specification of Letters Patent.  Patented Apr. 23, 1918.

Application filed March 23, 1917. Serial No. 156,849.

*To all whom it may concern:*

Be it known that I, JOSEPH W. THROPP, a citizen of the United States, residing at Trenton, in the county of Mercer and State of New Jersey, have invented certain new and useful Improvements in Antifriction-Bearings, of which the following is a specification.

The present invention relates to anti-friction bearings, and more particularly, to anti-friction bearings for rotary shafts supporting and moving relatively heavy loads and resisting relatively heavy load pressures.

The object of the invention is to produce such a bearing, in which there shall be combined simplicity of construction, strength and flexibility, and in which the friction shall be reduced to a minimum.

To the above ends, the present invention consists of a bearing having one or more independently mounted rollers for supporting the load shaft and means to retain the supporting roller or rollers in a fixed angular position with relation to the load shaft, and said roller or rollers being mounted on anti-friction bearings, and it further consists of the devices and combinations of devices which will be hereinafter described and claimed.

The present invention is shown in the accompanying drawings in which—

Similar reference characters will be employed throughout the specifications and drawings to designate corresponding parts.

Figure 1:
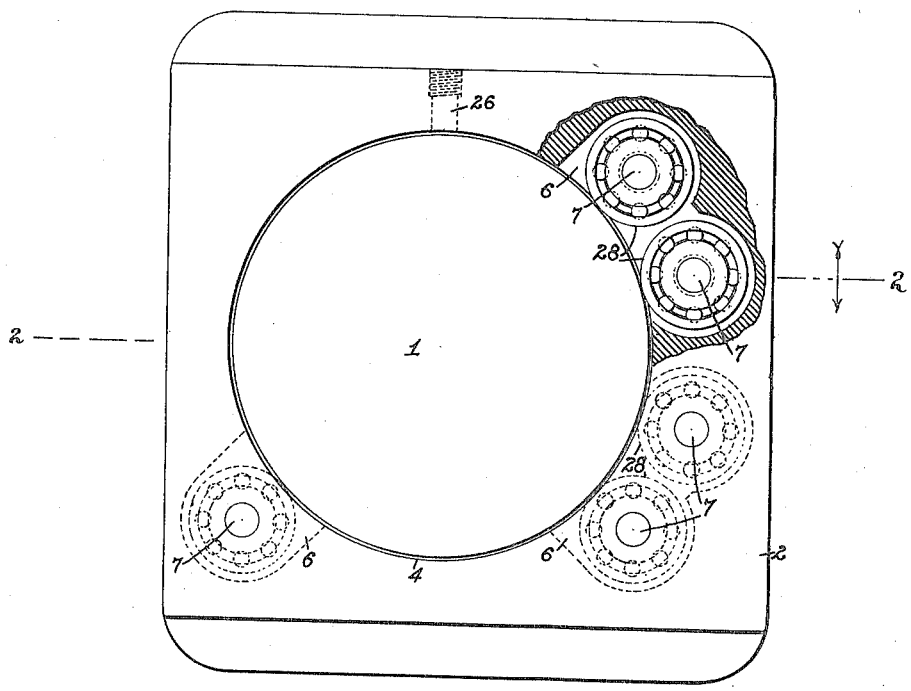
Figure 1 shows an end view of a bearing embodying the invention in one of its forms, a portion of the casing being broken away to show the underlying construction.

In the drawings, "1" indicates a cylindrical rotating shaft which supports and carries the load, and which I shall hereinafter designate as the load shaft. The load shaft "1" is supported at its opposite ends by a pair of the anti-friction bearings, one only of which is shown in the drawings. The bearing consists of a suitable box or casing, "2", the side walls "3" of which are provided with openings, "4", through which the ends of the load shaft "1" project. The load shaft "1" in the simplest form of the invention, rests upon and is supported by a bearing roller, "5", received in a recess, "6", formed in the casing "1" and opening therein, so that the periphery of the roller "5" may project therefrom a sufficient distance to permit contact of the load shaft "1" with the surface of the roller "5".

In that form of the invention shown in Figs. 1, 2, 3, 4 and 6, the roller, "5", is fixedly positioned and mounted to turn upon a shaft, "7", the ends of which are mounted in suitable openings in the walls of the box or casing, "2". The roller, "5", at each of its ends is recessed, as shown at "8" in Fig. 3, and within the recesses is fitted an anti-friction bearing comprising the ringlike members "9" and "10", and the balls "11" and the cage "12" (see Fig. 3). It is understood, of course, that the ringlike member "9" rotates with the roller "5" about the shaft "7", and that the ringlike member "10" is fixedly held to the stationary shaft, and thus the frictional resistance to the rotation of the roller "5" is reduced to a minimum.

Figure 2:
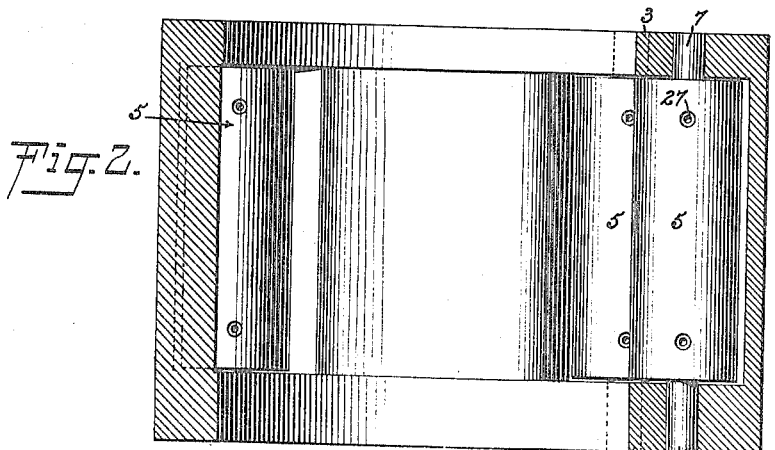
Fig. 2 shows a transverse sectional view taken on the broken line 2—2 in Fig. 1, looking downward in the direction of the arrow in that figure.
Figure 3:
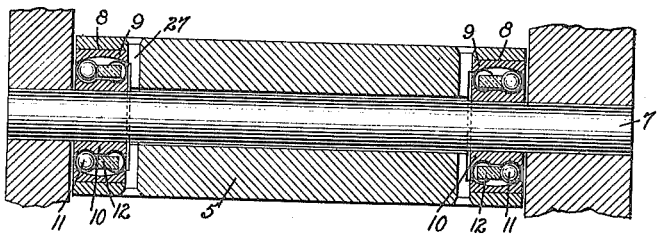
Fig. 3 is a longitudinal sectional view through one of the anti-friction rollers supporting the load shaft, the supporting shaft for the anti-friction roller being shown in elevation.
Figure 4:
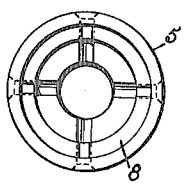
Fig. 4 shows an end view of the supporting roller shown in Fig. 3.
Figure 6:
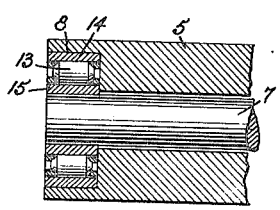
Figs. 6 and 7 show one end of modifications of the constructions shown in Figs. 3 and 5, in which the anti-friction bearings for the rollers are formed of rollers instead of balls, these views showing one end of the supporting roller in section taken on a line cutting a diameter of the roller.

In Fig. 6 the construction is exactly like that shown in Figs. 1, 2 and 3, with the exception that rollers "13" are substituted for the balls "11", and the ringlike members "14" and "15" are modified so that they have plane surfaces to coöperate with the rollers, rather than the curved surfaces, as shown in Fig. 3. Otherwise than as set forth, the construction of Fig. 6 is exactly like that shown in Fig. 3.

Figure 5:
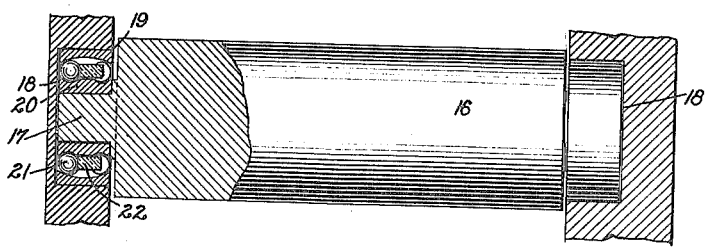
Fig. 5 shows a modified form, in which the supporting roller instead of being mounted on a shaft, is provided with trunnions at its opposite ends, one end of the roller and its supporting bearing being shown in section taken on a line cutting a diameter of the trunnion.
Figure 7:
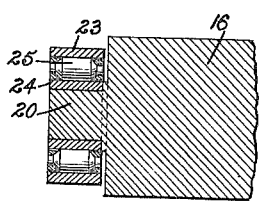

In the modified form shown in Figs. 5 and 7, the rollers "16", which correspond to the rollers "5", are provided with integrally formed trunnions, "17", which are supported by anti-friction bearings mounted in recesses, "18", in the walls of the box or casing, "2". In this form of my invention, the anti-friction bearing in Fig. 5 consists of the ringlike member, "19" fixedly mounted in the recess "18", and a ringlike member "20" rotating with the trunnion "17", between which members "19" and "20" are arranged the balls "21" and the cage, "22". In Fig. 7 the anti-friction bearing consists of the ringlike members "23" and "24", with rollers "25" substituted for the balls, "21".

While a single anti-friction roller may be sufficient in some cases, if properly positioned to support the load shaft and eliminate friction, yet in the preferred form of my invention, is included a plurality of such anti-friction roller bearings, so positioned as to distribute the load pressures as the circumstances and uses of the machine in which it shall be embodied, dictates, and in Fig. 1, I have shown such a bearing in which there are five anti-friction rollers engaging the load shaft. In this figure, assuming that the maximum strains are exerted from the top downward, substantially all the load and pressure will be supported and resisted by the three bearings located below the horizontal diameter of the load shaft "1," but if the maximum weight and load pressure is exerted from left to right, as shown in Fig. 1, it will be distributed against the four roller bearings at the right of the vertical diameter of the load shaft "1." The important feature of my invention is that each of the anti-friction bearings for the load shaft is mounted in a fixed position in which it is free to rotate under a minimum friction, because of the independently operating anti-friction bearings for each roller, and by this construction I provide for the equal distribution of the load strains among a plurality of independently acting anti-friction bearings.

For the purpose of lubrication, I have shown an oil aperture, "26," in the box or casing, "2," and preferably each of the rollers, "5," will be provided with lubricating apertures, "27," admitting a lubricant directly to the anti-friction bearings of the rollers.

It is to be noted that the roller bearings at the right of Fig. 1 are arranged in pairs at the same relative angular position above and below a horizontal line cutting the diameter of the load shaft, and that the recesses, "28," for each pair of rollers, communicate with each other, as shown in Fig. 1.

By the foregoing, it is to be noted that I produce a compound bearing, in which a relatively large diameter revolves in contact with relatively smaller diameters, the relative diameters being such that the rotation of the rollers is proportionately greater than the rotation of the load shaft. Thus, the pressure is compounded relatively to the velocity of the supporting rollers.

Claims.

1. In an anti-friction machine bearing, a box or casing having an opening, a load shaft disposed within said opening, a plurality of bearing rollers arranged parallel with said load shaft, each of said bearing rollers having a fixed shaft carried by said box or casing, anti-friction devices disposed between the roller and its shaft, each of said rollers being arranged to project within the opening and being in engagement with said load shaft, said casing having an oil opening in its upper part and each of said rollers being provided with radially disposed lubricating openings extending from the periphery of the roller to the anti-friction devices, for lubricating the latter.

2. In an anti-friction machine bearing, a box or casing having an opening, a load shaft disposed within said opening, a pair of bearing rollers arranged parallel with the load shaft and below the center of the latter, there being one roller on each side of the vertical plane through the center of the load shaft, and a plurality of similar bearing rollers on one side of the vertical plane through the load shaft, said side rollers being disposed both below and above the center of the load shaft.

3. In an anti-friction machine bearing, a box or casing having an opening, a load shaft disposed within said opening, a pair of bearing rollers arranged parallel with the load shaft and below the center of the latter, there being one roller on each side of a vertical plane through the center of the load shaft, and a plurality of bearing rollers on one side of the vertical plane through the load shaft, said rollers being disposed both below and above the center of the load shaft, and anti-friction bearings for each of said bearing rollers.

JOSEPH W. THROPP.